Oct. 24, 1939.                    W. F. PUNTE                    2,177,028
                             SHEET METAL CAN BODY
                             Filed Sept. 30, 1936
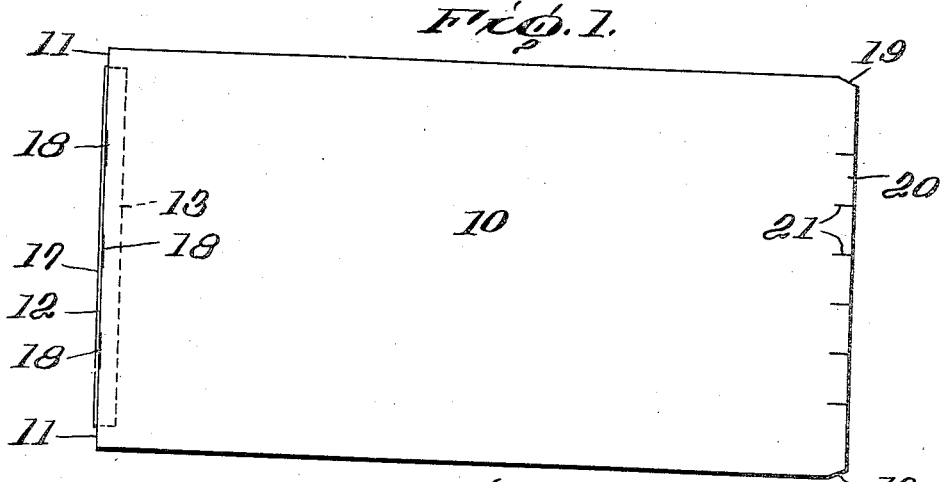
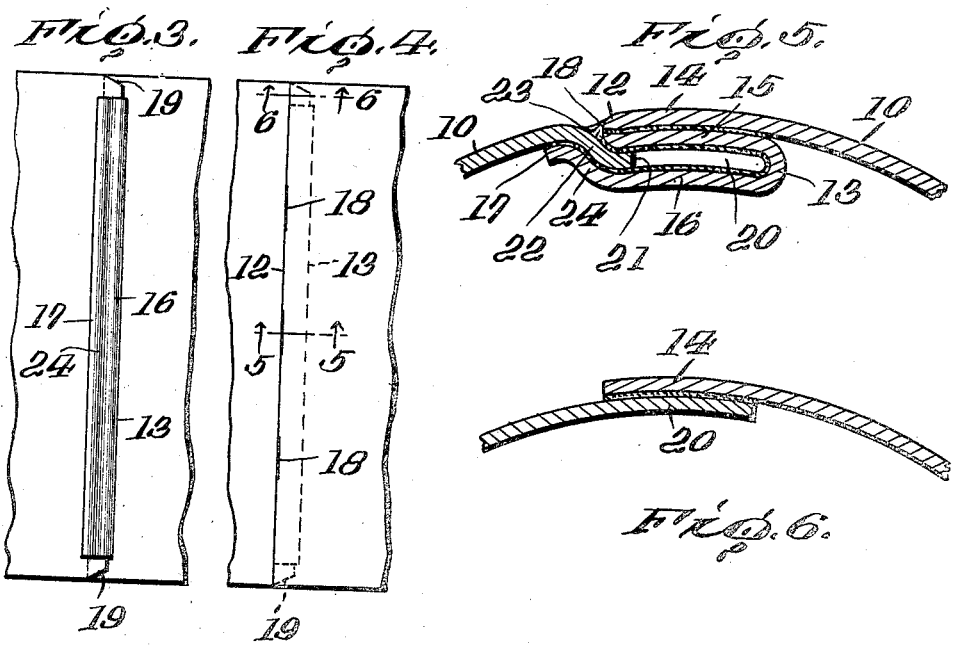
Inventor
William F. Punte
By Mason & Porter
Attorneys Patented Oct. 24, 1939

2,177,028

UNITED STATES PATENT OFFICE 2,177,028

SHEET METAL CAN BODY

William F. Punte, Syracuse, N. Y., assignor to Continental Can Company, Inc., New York, N. Y., a corporation of New York Application September 30, 1936, Serial No. 103,434

1 Claim. (Cl. 220—76)

This invention relates to new and useful improvements in a sheet metal can body, and particularly in the solder bonded side seam thereof.

In using cans for the packaging of certain liquids, such as beer for example, it is a common practice to heat the contents of the can for the purpose of sterilizing it, after the can is sealed, and this develops a very high internal presure. It is highly important, therefore, that a can used for this purpose should have a very strong side seam.

Since the pressure of the liquid is exerted equally in all directions, the net result is that the strain imposed on the side seam is chiefly tangential. In a can having a side seam with the usual interengaging hooks, the tangential strain tends to unfold the hooks and this tendency imposes a direct tensile stress upon the solder bond between the contacting faces of the hooks, which often ruptures the bond.

The lap seam offers more resistance to tangential strain than a seam having interengaging hooks because the stresses imposed on the solder bond are of a shearing character. The side seam is usually formed by lapping one edge portion of the blank on the other edge portion thereof and applying solder between the contacting faces. The solder bond is limited by the width of the lapping sections; that is, the extent of the solder bond is determined by the width of the side seam.

An object of the present invention is to provide a side seam for metal can bodies, wherein the edge portions of the body blank are lapped so that the solder bond is subjected to a shearing stress and wherein the metal parts are shaped so as to hold the parts engaged during solder bonding.

The distinctive features of the invention and the advantages thereof will be more specifically explained in connection with the accompanying drawing, in which:

Fig. 1 is a plan view of the can body blank with one end folded, prior to bending the blank to a cylindrical form.

Fig. 2 is a side elevation of the same.

Fig. 3 is an elevation of the seam after it is bumped, as viewed from the inside of the can body.

Fig. 4 is an elevation of the same, as viewed from the outside of the can body.

Fig. 5 is an enlarged section taken on the line 5—5 of Fig. 4.

Fig. 6 is an enlarged section taken on the line 6—6 of Fig. 4.

In accordance with the invention, the body blank 10, as shown in Figs. 1 and 2, has corner notches 11 cut in one end of the blank and the portion of the blank between these notches is folded in opposite directions on the lines 12 and 13 to form a double hook consisting of an outer face 14, an intermediate web 15 and an inner face 16, the terminal edge 17 being somewhat beyond the fold line 12.

A series of slits 18 are cut along the fold line 12, preferably before the folds are made. At the opposite end of the blank, the corners are mitered or tapered, as at 19, and in the tongue portion 20 between these tapered corners, a series of longitudinal slits or kerfs 21 are cut.

The blank, as thus formed, is bent to a cylindrical shape, the tongue portion 20, which constitutes the inner side of the seam, is seated within the fold 13, and the seam is then bumped to the shape shown in Fig. 5. It will be noted that the base 22 of the tongue portion 20 is bent part way around the fold 12 leaving a recess 23 to which the molten solder is applied. The portion of the side 16 which extends beyond the fold 12 is also bent in a similar manner, as shown at 24, thus forming a retaining member which holds the tongue 20 firmly seated in the fold 13 while it is being soldered. The outside of the can body thus presents a continuous uniform cylindrical surface with no raw edge.

In bringing the ends of the blank together, it will be understood that the corner portions are lapped as shown in Fig. 6, the edges 19 being tapered in order to facilitate the subsequent flanging of the ends of the body, and the addition of the end closures to the can in a manner which is well known.

As the solder is applied in the usual manner to the recess 23, it flows by capillary attraction to all parts of the seam. A portion of it flows between the side 15 and the tongue 20 and thence on the other side of the tongue 20 to the extreme end of the side 16, the slits 21 being provided to prevent possible trapping of the gases and damming of the solder by the pinching of the end of the tongue in the fold 13. Another portion of the solder flows through the slits 18 and between the sides 14 and 15 of the fold 12.

It will be apparent that a side seam constructed as above described is exceptionally strong. There is a solder bond on both sides of the tongue 20, which affords double the strength of the usual lap seam. This is further reinforced by a solder bond with the curved extension 24 of the side 16. The tangential strain set up by internal pressure in the can develops only a shearing strain on this bond, against which the solder bond is most effective. There is substantially no tendency for the sides of the seam to hinge about the fold lines and thus rupture the solder bond between them by tensile stress, as in the case of interlocking hooks. The seam offers the utmost resistance against external knocks, as well as internal pressure.

It will be noted from the above that the solder bond uniting the edge portions of the body blank extends more than twice the distance that the edge portions are lapped. This increases the strength of the side seam without unduly increasing the width of the side seam.

It will also be noted that the bending of the metal parts adjacent one edge of the side seam not only greatly facilitates the handling of the body during soldering but also increases to a considerable extent the solder bond uniting the edge portions. By the improved construction of side seam described, where the folded parts are on the interior of the can body, the exterior of the can body is of uniform diameter throughout, which has many advantages.

It will, of course, be understood that the details herein shown and described are for the purpose of illustration only and that the invention also includes all such modifications as may fall within the scope of the appended claim.

Having thus described the invention, what I claim as new and desire to secure by Letters Patent, is:

A sheet metal can body having a solder bonded side seam, one edge portion of the body being folded back upon the inner face of the body wall and reversely folded so as to extend beyond the first fold, said reversely folded portion being spaced away from the first-named folded portion so as to receive therebetween the other edge portion of the body wall, and said extended portion being bent outwardly so as to hold the last-named edge portion of the body wall in between the folded back portions, said body wall having slits formed therein at the first-named fold so as to permit the solder to flow by capillary attraction between the body wall and the first-named folded back portion, and said second-named edge portion of the body wall having slits formed therein extending at an angle to the edge for permitting the solder to flow by capillary attraction so as to solder bond the inner faces of both of the folded back portions to said edge portion of the body wall.

WILLIAM F. PUNTE.